United States Patent [19]

Palumbo et al.

[11] 3,801,812
[45] Apr. 2, 1974

[54] FISHING LIGHT
[76] Inventors: Vincent F. Palumbo; Russell C. Rivers; Jack G. Horner, all of 7923 Hartford St., Houston, Tex. 77017
[22] Filed: Nov. 29, 1972
[21] Appl. No.: 310,231

[52] U.S. Cl. ............. 240/52 R, 240/6.4 F, 240/26, 240/DIG. 5
[51] Int. Cl. .......................................... F21v 21/00
[58] Field of Search ........ 240/26, 6.4 F, 11.2, 52 R, 240/90, DIG. 5; 43/17.5; 9/8.3 R, 8.3 E

[56] References Cited
UNITED STATES PATENTS
| | | | |
|---|---|---|---|
| 3,464,139 | 9/1969 | Eggers | 240/26 X |
| 2,832,968 | 5/1958 | Knudsen | 240/26 |
| 2,806,942 | 9/1957 | Oharenko | 240/90 |
| 3,160,349 | 12/1964 | Kent | 240/52 R |
| 3,366,788 | 1/1968 | Lantery | 240/52 R |
| 3,012,798 | 12/1961 | Berger | 240/52 R X |

Primary Examiner—Richard L. Moses
Attorney, Agent, or Firm—Donald Gunn

[57] ABSTRACT

A fishing light wherein a typical automobile headlight fixture is encased in a specially shaped body preferably formed of a low density styrofoam structure surrounding the fixture. The plastic structure incorporates a lip which engages the outer edge of the lamp and further includes finger grip holes enabling easy replacement of the lamp. The surrounding styrofoam body is spaced from the lamp a small distance at the back side of the lamp. The device has a center of gravity which causes it to invert in the water, focusing a beam of light downwardly into the water.

8 Claims, 4 Drawing Figures

PATENTED APR 2 1974 3,801,812

FISHING LIGHT

PRIOR ART

U.S. Pat. Nos. 3,464,139; 2,908,101; 2,485,087; 3,617,733; 3,302,014.

BACKGROUND OF THE INVENTION

Attempts have been made in the past to provide fishing lights which can be placed in water. However, prior efforts suffer from many defects such as being susceptible to trapping of heat generated by the light. Heat trapped in a styrofoam or other low density polyolefin body tends to build up and can melt the surrounding structure. The devices of the prior art are susceptible to tipping, and focusing the beam of light emitted thereby away from the water. They must be specially weighted to cause the beam of light to point downwardly into the water. They do not inherently tip and float face downward as is the case with the present invention.

SUMMARY OF THE INVENTION

The present invention is summarized as providing a resilient float which is adapted to be joined to and receive a conventional automobile headlight. The float surrounds the headlight and positions the center of gravity such that it tips, aiming the lamp into the water. Finger grip openings are formed in the periphery to enable a user to remove the lamp for servicing. The lamp is engaged at its edge or lip, but the surrounding structure is spaced from the back wall to permit air circulation as a means of cooling the cavity where the lamp is inserted. This prevents heat build-up and enables the equipment to be cooled.

DESCRIPTION OF THE PREFERRED EMBODIMENT

Figure 1:
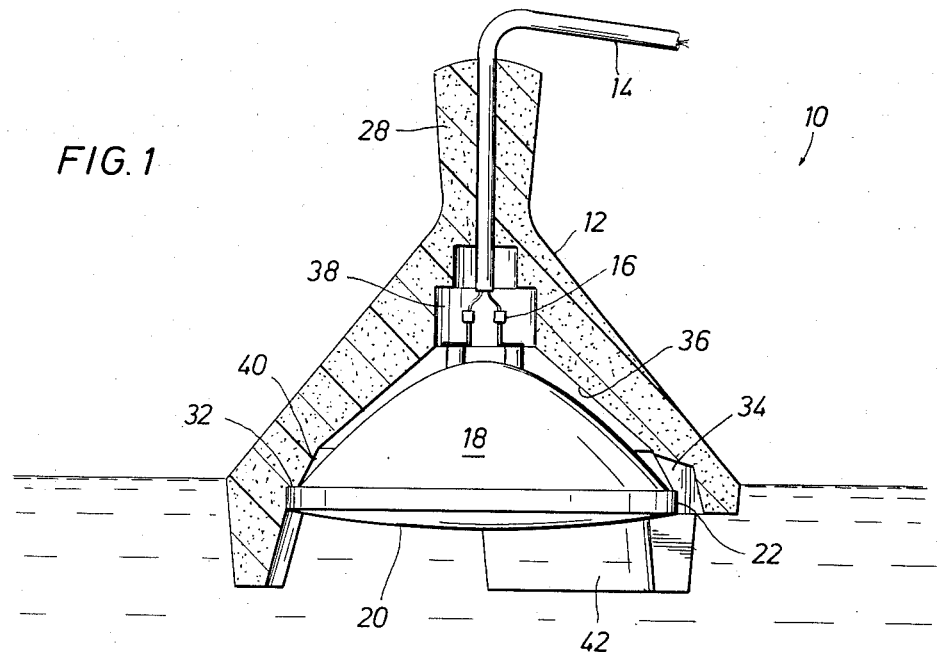
FIG. 1 is a sectional view of the fishing light of the present invention illustrating details of construction of the surrounding floatable body and a lighting fixture wherein the center of gravity tips the device to maintain it face down.
Figure 2:
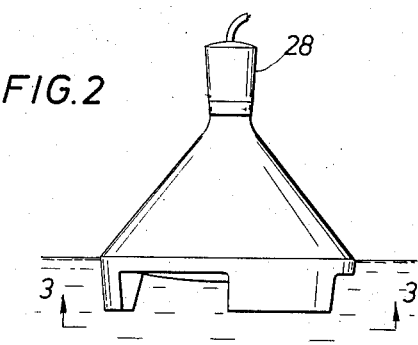
FIG. 2 is a view showing the fishing light of the present invention on the surface of the water.

Attention is first directed to FIG. 1 where the fishing light 10 incorporates a styrofoam body 12. The cord 14 extends to a suitable battery or other voltage source, and is preferably rubber insulated and connects internally with a pair of conductors which are joined to releasable connectors 16. The connectors 16 are preferably of the same sort found in automobile equipment and preferably engage the projecting prongs found on the back of a conventional headlight fixture 18. The headlight fixture 18 is preferably of the sort used in automobiles, and includes a filament and surrounding glass envelope. The glass envelope includes an integral reflector and clear front lens 20. The front lens 20 extends outwardly to an encircling lip 22 which defines the back portion of the front lens 20 and the front edge of the integral reflector within the light fixture 18.

The resilient material chosen for the present invention is preferably styrofoam having a density of two to four pounds per cubic foot. Heavier weights can be used, but the added strength is not necessary. Relative costs generally constitute an upper limit on the density of the material used for fabrication of the floating body 12. The lower limit generally relates to the thermal conductivity of the material. A lighter foam material can be almost too efficient a heat insulator and cause a substantial build-up of heat within the interior adjacent to the light fixture 18.

The floating body 12 is constructed having an upper stem 28 which supports the electrical cord 14 and aligns it for connection with terminals 16. The projecting portion 28 is preferably shaped to serve as a handle and ranges up to about two inches in diameter to enable it to be hand-held. Its height from the narrow neck to the end is preferably about three or four inches.

The lower portions of the styrofoam body 12 include an internal shoulder 32 adapted to contact and engage the lip 22 of the light fixture 18. The internal shoulder 32 extends fully about the lip 22 except that it is interrupted at three points. In the preferred embodiment, three interruptions comprise the finger cavity 34 on the right hand side of FIG. 1. The finger cavity provides a clearance of perhaps one-half inch or more permitting the user to insert his fingers behind the lip 22 and on the back of the lamp 18 to disengage the lamp. The finger grip cavities 34 are perhaps 1 or 2 inches wide to enable one or two fingers to be inserted. They extend perhaps 1 to 1½ inches deep, thereby providing adequate room for ease of removal of the lamp 18.

An inner wall 36 is preferably conic in shape and is positioned immediately behind the lamp 18. The inner wall 36 extends from immediately behind the shoulder 32 toward a central cavity 38. The cavity 38 provides adequate space or volume for receiving the electrical terminals on the back of the lamp 18 and the conductors 18. The cavity 38 is preferably circular in cross section and connects with the conic surface 36 which extends outwardly in a fashion forming a flared opening extending from the cavity 38 to the shoulder 32.

The inner surface 36 extends from a more abruptly angled surface 40 which is of even depth in comparison with the cavities 34 which define the finger grip cavities. The surface 40 extends at a more abrupt angle so that the conic surface 36 is spaced from the back of the lamp 18. This defines an inner volume within the floating body 12 which is provided for purposes of heat dissipation and circulation. The lamp 18 generates a substantial amount of heat, and air can be circulated on the back side of the lamp 18. Entry of air is permitted through the cavities 34 which are in communication with the small space on the back side of the lamp 18 and the large central cavity 38. As the build-up of heat occurs, circulation through the device is permitted, particularly at times when the device is out of water.

Figure 3:
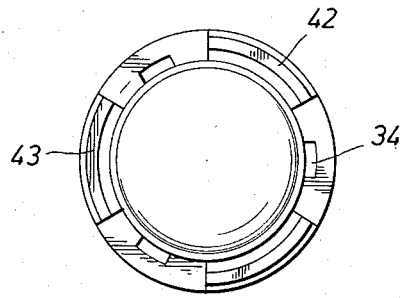
FIG. 3 is a view looking along the line 3 — 3 of FIG. 2 showing the face of the device, including the finger grip holes enabling easy removal of the light fixture; and, FIG. 4 shows the embodiment of the present invention installed on a mounting mechanism enabling the lamp to be aimed in a specified direction.

In FIG. 3, three cavities 34 are shown spaced about the periphery. An upstanding portion 42 is found at three locations and defines downwardly extending feet which enable the device to be rested on a flat surface and which protect the face 20 of the lamp 18 from fracture, damage or the like. The projecting feet 42 are somewhat arcuate in shape as illustrated in FIG. 3. They are interspersed adjacent to the cavities 34.

Figure 4:
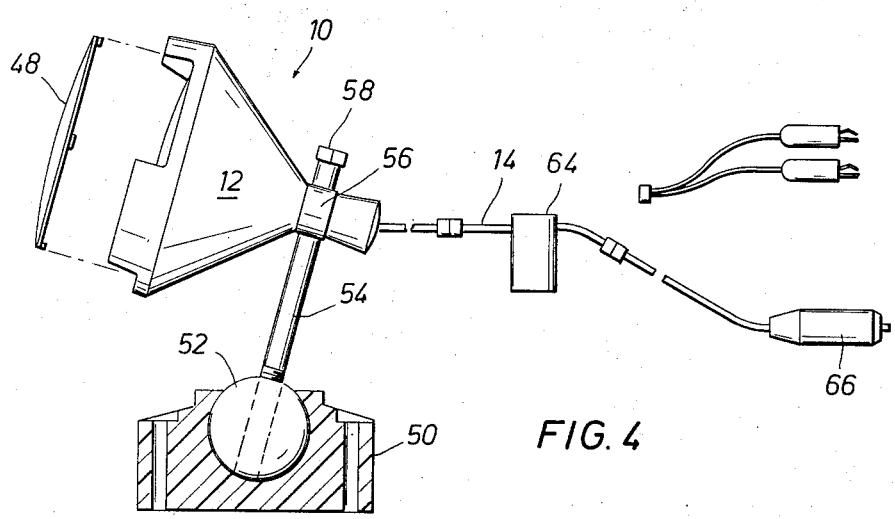

Attention is next directed to FIG. 4 where the fishing light 10 is shown in a different application. A colored face plate 48 has three lugs which preferably project into the finger cavities 34 and lock therein. The face plate 48 is preferably transparent but colored so as to convert the apparatus into a colored light. This can be used for safety purposes, signals, or the like. A mounting block 50 is adapted to receive a rotatable solid sphere 52. The sphere 52 is sunk into the mounting block 50 and is gripped only slightly so as to permit its rotation or movement. The sphere 52 is drilled along a diameter to enable a mounting bolt 54 to be threaded thereinto. The bolt 54 supports a collar 56 which preferably extends around the upper neck 28 of the insulated body 12. The collar 56 can be pivotal or of fixed construction. The bolt 54 is rotatable by manipulation of the head 58 by means of a wrench or the like. When it is rotated, the bolt feeds into the hole tapped in the sphere 52. As it extends on the other side, the bolt punches into the resilient material 50 which forms the mounting block. This tends to freeze the sphere 52 at a specified position and holds the bolt 54 against unthreading. When the bolt is so held, the mounting block 50 universally positions the sphere 52 and bolt 54 and serves as a multiposition mounting apparatus for the fishing light of the present invention. The mounting block 50 may be attached by any suitable manner to a bolt. This will then enable the lamp to be located at a specified or desired location. The lamp can then be fixed in the desired location by rotation of the bolt 54 to hold it in the locked position.

A blinker element 64 in the electrical conductor 14 can be optionally added. An optional cigarette lighter plug 66 can be inserted into the cigarette lighter of a vehicle. Alligator clips and the like can also be used to secure the electrical conductor 14 to a voltage source.

The apparatus of the present invention tends to tip into the upright position of FIG. 1 in the event it is placed in the water on its side. This tendency to tip results in part from the overhang of the feet 42. When the device is in the horizontal position, the overhang moves the center of gravity toward the front edge. The handle 28 is relatively small and light weight, and does not measurably contribute to returning the center of gravity toward the back of the device in the horizontal position. The side of the device which is submerged swings downwardly and under as the top side, which is out of the water, rotates toward the water to rotate the device to an angle of about 90° from the horizontal to the vertical position.

When the device is in the water, the water contacts the transparent material which comprises the housing of the lamp 18 and maintains it at a stabilized temperature. The temperature of the interior is further stabilized below levels which might do damage by virtue of the circulation through the space to the rear of the lamp and through the finger cavities 34.

FIG. 4 illustrates numerous accessories. A colored lens can be optionally used, and a voltage interrupting circuit 64 causes the device to form a blinking signal.

Many alternations and variations of the present invention may be incorporated without departing from the scope thereof, which is determined by the claims appended hereto.

We claim:

1. A submersible fishing light apparatus comprising:

an integrally formed light having a transparent front face, and an internal light source which is electrically operated;

a surrounding body formed of a material which causes the submersible light apparatus to float when placed in the water;

means for mounting said body for universal movement; and, a resilient body, a rotatable and drilled cooperative means received in a cavity within said body, an elongate and rotatable mounting member for supporting said light apparatus, said mounting member being engaged in said drilled mounting means and controllably extendable into said resilient body to cause deformation thereof and lock said drilled means and said mounting member in a fixed position.

2. The structure of claim 1 wherein the surrounding body engages the light around the edge of the front face and including at least one opening formed therein which extends at least partly behind said light.

3. The structure of claim 2 wherein said opening is adapted to receive the fingers of a user for purposes of assembling or disassembling.

4. The structure of claim 2 wherein said body is spaced away from the back side of said light to define an air space therein which extends to an enlarged central cavity adapted to receive a connective means of an electrical system for providing power to said light.

5. The apparatus of claim 1 including a removable transparent colored lens releasably attached to said surrounding body over the face of said light.

6. The structure of claim 1 including at least two projecting arcuately curved members on said body extending forwardly of said light and the front face thereof.

7. The apparatus of claim 6 wherein an opening means is located between said curved members, said opening means being arcuately shaped and extending into said body and behind the edge of said light enabling finger engagement of said light for removal from said body.

8. The apparatus of claim 1 including threads in said drilled means and on said mounting member for threaded engagement and for advancing said mounting member controllably into said resilient body.

* * * * *